US005981077A

United States Patent [19]

Taniguchi

[11] Patent Number: 5,981,077

[45] Date of Patent: Nov. 9, 1999

[54] IMAGE TRANSFER SHEET AND IMAGE FORMING METHOD THEREFOR

[75] Inventor: Keishi Taniguchi, Susono, Japan

[73] Assignee: Ricoh Company, Ltd., Tokyo, Japan

[21] Appl. No.: 08/861,953

[22] Filed: May 22, 1997

[30] Foreign Application Priority Data

| | | | |
|---|---|---|---|
| May 29, 1996 | [JP] | Japan | 8-135434 |
| May 12, 1997 | [JP] | Japan | 9-120974 |

[51] Int. Cl.$^{6}$ .......... B32B 9/04

[52] U.S. Cl. .......... 428/447; 428/448; 428/482

[58] Field of Search .......... 428/447, 448, 428/482

[56] References Cited

U.S. PATENT DOCUMENTS

| | | | |
|---|---|---|---|
| 5,260,139 | 11/1993 | Shiraishi et al. | 428/488.1 |
| 5,721,086 | 2/1998 | Emslander et al. | 430/126 |

*Primary Examiner*—Mark Chapman
*Attorney, Agent, or Firm*—Cooper & Dunham LLP

[57] ABSTRACT

An image transfer sheet in which a releasing layer is formed on at least one side of a substrate and an image transfer layer including a self-crosslinkable polymer is formed on the releasing layer. An image is formed on the image transfer layer by an electrophotography method, a thermal transfer recording method or the like, and then transferred onto an image receiving material. The transferred image on the image receiving material has good image qualities and good resistance to heat of iron and washing.

22 Claims, No Drawings

IMAGE TRANSFER SHEET AND IMAGE FORMING METHOD THEREFOR

BACKGROUND OF THE INVENTION

1. Field of the Invention

The present invention relates to an image transfer sheet and an image forming method therefor in which an image is formed on the image transfer sheet by an image recording method, such as electrophotography, thermal transfer recording, ink jet recording or the like and the formed image on the image transfer sheet is transferred onto an image receiving material, such as cloth, canvas, plastics, paper, wood, leather, glass, china, metals or the like.

2. Discussion of the Related Art

Recently, a variety of image forming apparatus have been developed and utilized for copiers and printers for computers or the like. The images formed with these image forming apparatus are not only used for a purpose of reading or viewing, but also tried to be applied for various new applications.

As one of these new applications of the images, a method is proposed in which the images are transferred onto an image receiving material, such as cloth, canvas, plastics, paper, wood, leather, glass, china, metals or the like. This method is useful for manufacturing a small lot of made-to-order goods having original pictures thereon, such as T-shirts, sweat shirts, aprons, jackets, cups, plates or stained glass and for duplicating of pictures on canvas. Currently, since full color copiers are developed and high quality full color images can easily be obtained, the demand for this method is increasing more and more.

Such an image transfer sheet that transfers toner images thereon onto an above-mentioned image receiving material is discussed in Japanese Laid-Open Patent Application No. 52-82509, incorporated herein by this reference. In the patent application, an image transfer sheet is disclosed in which an adhesive layer including an adhesive material selected from the group consisting of silicone and fluorine-containing polymers is formed on a substrate and an image transfer layer including a specific polymer having a relatively low melting point is formed on the adhesive layer. Toner images are formed on the image transfer layer and the formed toner images are then transferred onto an image receiving material together with the image transfer layer which is softened when heated to transfer the toner images. The specific examples of the polymer having a relatively low melting point which are described for use in the image transfer layer of the patent application are the polymers selected from the group consisting of polyvinyl chloride, polyvinyl acetate, polymethyl methacrylate, polyethyl methacrylate, polybutyl methacrylate and polyvinylidene chloride and the mixtures and the copolymers thereof. However, the adhesion of these polymers to the above-mentioned image receiving materials is insufficient, so that a problem occurs in which transferred images on the image receiving materials are easily peeled from the image receiving materials after several times of washing. In addition, a problem also occurs in which transferred images are destroyed or adhered to an iron when the image receiving material bearing transferred images is ironed. This is because the transferred images are melted or softened by the heat of the iron.

Because of these reasons, a need exists for an image transfer sheet which has good image receivability when an image is formed on the image transfer sheet and good image transferability and fixability when the image is transferred onto various receiving materials.

SUMMARY OF THE INVENTION

Accordingly, an object of the present invention is to provide an image transfer sheet which has good image receivability when an image is formed on the image transfer sheet and good image transferability and fixability when the image is transferred onto various receiving materials.

Another object of the present invention is to provide an image transfer sheet in which an image formed on the image transfer sheet can easily be transferred onto various image receiving materials without any complicated techniques even after the image transfer sheet is cooled, which is useful for when it is desired that a large image is transferred onto the image receiving materials.

Yet another object of the present invention is to provide an image transfer sheet which can be manufactured without using organic solvents, resulting in preventing environmental pollution and cost effective manufacturing.

A further object of the present invention is to provide an image transfer sheet having good feeding properties without jamming when images are formed thereon in image forming apparatus.

To achieve such objects of the present invention, the present invention contemplates the provision of an image transfer sheet in which a releasing layer is formed on at least one side of a substrate and an image transfer layer including a self-crosslinkable polymer is formed on the releasing layer. Preferably, the releasing layer includes a silicone compound, and more preferably the silicone compound includes a room-temperature vulcanizing silicone rubber.

In addition, the self-crosslinkable polymer preferably has a methylol group and/or an alkoxymethyl group as a self-crosslinkable component, and more preferably the self-crosslinkable polymer is an ethylene-vinyl acetate-acrylate copolymer having a methylol group and/or an alkoxymethyl group as a self-crosslinkable component.

Further, the image transfer layer preferably includes a self-crosslinkable polymer having a glass transition temperature (Tg) higher than or equal to 0° C. and a self-crosslinkable polymer having a glass transition temperature (Tg) lower than 0° C.

Furthermore, the room-temperature vulcanizing silicone rubber and the self-crosslinkable polymer are preferably aqueous emulsion types.

In another embodiment of the present invention, an image forming method is provided in which a toner image is formed on the image transfer sheet by an electrophotography method and fixed upon application of at least one of heat and pressure.

In yet another embodiment of the present invention, an image forming method is provided in which a thermofusible ink image or a sublimation dye image is formed on the image transfer sheet by a thermal transfer recording method.

These and other objects, features and advantages of the present invention will become apparent upon consideration of the following description of the preferred embodiments of the present invention.

DESCRIPTION OF THE PREFERRED EMBODIMENTS

Generally, the present invention provides an image transfer sheet in which a releasing layer preferably including a silicone compound is formed on at least one side of a substrate, a transfer layer including a self-crosslinkable polymer is formed on the releasing layer and, if necessary, a back coat layer is formed on the non-layered side of the substrate and the image forming method therefor.

The image forming method of the present invention is, for example, as follows:

(1) an image is formed on the transfer layer with toner, ink, a dye or the like by an electrophotography method, a thermal transfer recording method, an ink jet recording method or the like;

(2) an image receiving material is superimposed on the image on the image transfer sheet;

(3) heat and pressure are applied to the image transfer sheet and the image receiving material to transfer the image onto the image receiving material; and (4) after the image transfer sheet and the image receiving material are cooled to room temperature, the image transfer sheet is released from the image receiving material to form the image on the image receiving material.

The image transfer sheet of the present invention has advantages as follows:

(1) the image transfer layer has good receivability of a toner, an ink or a dye image when the image is formed on the image transfer layer by conventional image forming methods, such as electrophotography, thermal transfer recording, ink jet recording or the like;

(2) the image transfer layer easily softens upon application of heat and pressure and firmly adheres on various image receiving materials when the image is transferred onto the image receiving materials;

(3) a high quality image can be formed on the image receiving materials together with the image transfer layer because the image transfer sheet can easily be released from the image receiving materials at the interface of the releasing layer and the image transfer layer even when the image transfer sheet is cooled to room temperature; and (4) the transferred image has good resistance to the heat of an iron and washing because the transfer layer including a self-crosslinkable polymer is crosslinked by the effect of the heat applied for transferring the image.

Suitable materials for use in the releasing layer of the present invention include waxes, such as polyethylene wax, paraffin wax, carnauba wax, candelilla wax, rice wax, lanolin wax, ester wax, oxidized wax, petroleum resin wax, montan wax, bisamide type wax and microcrystalline wax; higher fatty acids and derivatives thereof, such as higher fatty acids, higher fatty acid monoglyceride and higher fatty acid amides; higher aliphatic alcohols; and resins, such as polyethylene, ethylene-vinyl acetate copolymers (EVA), polypropylene, alkyd resins, urethane resins, acrylic resins, polyester resins, fluorine-containing resins, silicone resins and derivatives thereof. These materials are employed alone or in combination.

Among these materials, silicone compounds are preferable because of providing the image transfer sheet with good releasability from the image receiving material even when the image transfer sheet is cooled to room temperature after an image is transferred onto the image receiving material upon application of heat and pressure.

Suitable silicone compounds for use in the releasing layer include silicone oils, silicone waxes, silicone rubbers, and silicone resins. Among these silicone compounds, silicone rubbers are preferable and room-temperature vulcanizing silicone rubbers are more preferable. The room-temperature vulcanizing silicone rubbers are preferably aqueous emulsion types to prevent environmental pollution caused by evaporation of organic solvents and to save a manufacturing cost. In addition, when the room-temperature vulcanizing silicone rubbers are used for the releasing layer, highly crosslinked silicone rubbers are obtained without heating for crosslinking the releasing layer, resulting in saving a manufacturing cost. When a highly crosslinked releasing layer is formed, the image transfer layer can easily release from the releasing layer when images on the image transfer layer are transferred onto the image receiving materials because the releasing layer has sufficiently good heat resistance so as not to become mixed with the image transfer layer by the effect of the heat for transferring the images. Therefore, the image transfer sheet of the present invention can solve the following drawbacks of conventional image transfer sheets:

(1) a uniform and high quality image cannot be obtained unless the image transfer sheet is released from an image receiving material while the image transfer sheet and the image receiving material are hot; and (2) when a large image is transferred, a uniform and high quality image cannot be obtained because the releasability of the image transfer sheet from the image receiving material is different at the release start point and the release end point.

The preferred coating weight of the releasing layer is from about 0.05 to about 5.0 $g/m^2$ on a dry basis to maintain good releasability of the image transfer sheet from the image receiving materials.

Suitable self-crosslinkable polymers for use in the image transfer layer of the image transfer sheet of the present invention include polymers having a self-crosslinkable group such as, for example, methylol, alkoxymethyl, carboxyl, epoxy, hydroxy, amide, methylol modified acrylamide and vinyl. Among these polymers, polymers having at least one of a methylol group and an alkoxymethyl group are preferable and ethylene-vinyl acetate-acrylate copolymers having at least one of a methylol group and an alkoxymethyl group are more preferable because the image transfer layers including these polymers have good preserving properties and exhibit good crosslinking properties when the image transfer sheets are heated to transfer images. The self-crosslinkable polymers are preferably aqueous emulsion types to prevent environmental pollution caused by evaporation of organic solvents and to save a manufacturing cost.

The preferred crosslinking temperature of the self-crosslinkable polymer is from about 80 to about 250° C. to maintain good preserving properties and good crosslinking properties of the image transfer layer.

The preferred molecular weight of the self-crosslinkable polymer is from about 10,000 to about 500,000 to maintain good image fixability. In addition, preferably, both a self-crosslinkable polymer having a glass transition temperature (Tg) higher than or equal to 0° C. and a self-crosslinkable polymer having a glass transition temperature (Tg) lower than 0° C. are included in the image transfer layer and/or both a self-crosslinkable polymer having a molecular weight of from about 10,000 to about 500,000 and a self-crosslinkable polymer having a molecular weight of from about 10,000,000 to about 60,000,000 are included in the image transfer layer to maintain good image fixability of the transferred images and good feeding properties of the transfer sheet in image forming apparatus. The preferred mixing ratios of a self-crosslinkable polymer having a glass transition temperature (Tg) higher than or equal to 0° C. to a self-crosslinkable polymer having a glass transition temperature (Tg) lower than 0° C. and a self-crosslinkable polymer having a molecular weight of from about 10,000 to about 500,000 to a self-crosslinkable polymer having a molecular weight of from about 10,000,000 to about 60,000,000 are about 1/10to about 10/1by weight.

The preferred coating weight of the image transfer layer is from about 5 to about 200 g/$m^2$ on a dry basis to maintain good image transferability and good image fixability of the image transfer sheet.

The image transfer layer of the image transfer sheet of the present invention may include known materials, such as resins, rubbers or the like in addition to the self-crosslinkable polymer to control, for example, flexibility and resistance to rubbing of the image transfer layer. These materials should be added in an amount that will not interfere with the good image transferability and fixability of the image transfer sheet. Specific examples of these materials include thermoplastic polyurethane resins; polyamide resins; polyester resins; polyolefin; cellulose derivatives such as nitrocellulose and cellulose acetate; styrene resins and styrene copolymers such as polystyrene and poly $\alpha$-methyl styrene; (meth)acrylic resins such as polymethyl (meth)acrylate and polyethyl (meth)acrylate; vinyl polymers such as vinyl chloride-vinyl acetate copolymers and ethylene-vinyl acetate copolymers; rosin ester resins such as rosin and rosin modified maleic acid resins; natural or synthetic rubbers such as polyisoprene and styrene-butadiene copolymers; ionomers; epoxy resins; and phenolic resins.

Thermoplastic polyurethane resins include a polyurethane compound obtained by the reaction of an isocyanate compound and a polyol compound having hydroxy groups at the end of the molecule. Specific examples of the isocyanate compounds include aromatic diisocyanate compounds, such as tolylene diisocyanate, diphenylmethane-4, 4'-diisocyanate; alicyclic diisocyanate compounds such as isophorone diisocyanate; and aliphatic diisocyanate compounds, such as trimethylene diisocyanate, tetramethylene diisocyanate, hexamethylene diisocyanate and dodecamethylene diisocyanate. The polyol compounds include polyhydroxy compounds, such as alkanepolyol, polyesterpolyol and polyetherpolyol. Specific examples of alkanepolyol include 1,5-pentanediol, 1,8-octanediol, 1,10-decanediol and 1,12-dodecanediol. Specific examples of polyesterpolyol include, for example, aliphatic polyesterdiol compounds including at least one of aliphatic diol compounds and aliphatic dicarboxylic acid compounds which are mentioned later as a constitutional unit. Specific examples of the polyetherpolyol include diethylene glycol, triethylene glycol, polyethylene glycol, tripropylene glycol, polypropylene glycol and adducts of bisphenol A and an alkylene oxide such as ethylene oxide.

Specific examples of the polyamide resins include nylon 6, nylon 11, nylon 12, nylon 13, nylon 610, nylon 612 and nylon 616.

Specific examples of polyester resins include polyester resins having at least one of aliphatic diol compounds and aliphatic dicarboxylic acid compounds as a constitutional unit, and polyester resins having both of an aliphatic diol compound and an aliphatic dicarboxylic acid compound are more preferable. Preferably, the aliphatic carboxylic acid compounds are saturated aliphatic carboxylic acid compounds. Specific examples of the aliphatic diol compounds include ethylene glycol, diethylene glycol, triethylene glycol, polyethylene glycol, propylene glycol, dipropylene glycol, tripropylene glycol, polypropylene glycol, 1, 3-butanediol, 1, 4-butanediol, neopentyl glycol, 1,6-hexanediol and polymethylene glycol. Specific examples of the aliphatic carboxylic acid compounds include saturated aliphatic carboxylic acid compounds, such as succinic acid anhydride, adipic acid, azelaic acid, sebacic acid, suberic acid and dodecanedioic acid, and unsaturated aliphatic carboxylic acid compounds such as maleic acid and fumaric acid.

Specific examples of the polyolefin include polyethylene such as low density polyethylene and linear low density polyethylene, and modified polyolefins, such as ethylene-1-butene copolymers, ethylene-(4-methyl-1-pentene) copolymers, ethylene-vinyl acetate copolymers, ethylene-(meth)acrylic acid copolymers, ethylene-(meth)acrylate copolymers, propylene-1-butene copolymers, ethylene-propylene copolymers, ethylene-propylene-1-butene copolymers and olefin-maleic anhydride copolymers. Preferred polyolefin compounds are the modified polyolefins above-mentioned.

The image transfer layer of the image transfer sheet of the present invention may include auxiliary agents, such as tacking agents, antioxidants, ultraviolet absorbing agents, coloring agents, antistatic agents, flame retardants, waxes, plasticizers and fillers.

In addition, the image transfer sheet may include a back coat layer formed on the non-layered side of the substrate to prevent blocking of the image transfer sheet when preserved in a relatively high temperature environment and to obtain good feeding properties of the image transfer sheet in various image forming apparatus. The back coat layer preferably has good releasability and relatively low kinetic friction coefficient in order to obtain the above-mentioned properties.

Suitable materials useful for the back coat layer include polyethylene, polypropylene, polyvinyl chloride, polystyrene, polyvinylidene chloride, acrylonitrile-butadiene-styrene copolymers (ABS), acrylic resins, acrylonitrile-styrene copolymers (AS), acrylonitrile-acrylate-styrene (AAS), acrylonitrile-ethylene-styrene (AES), alkyd resins, poly-4-methyl-1-pentene, polybutene-1, polyvinylidene fluoride, polyvinyl fluoride, polycarbonate, polyamides, polyacetal, polyphenylene oxide, polyesters, polybutylene terephthalate, polyethylene terephthalate (PET), aromatic polyester resins, polyphenylene sulfide, polyimides, polysulfone, polyether sulfone, polyarylate, ethyl cellulose, hydroxy ethyl cellulose (HEC), hydroxy propyl cellulose, methyl cellulose, cellulose acetate, cellulose acetate butyrate, nitrocellulose, polyvinyl alcohol (PVA), polyvinyl acetate, polyvinyl butyral, polyvinyl acetal, polyvinyl pyrrolidone, polymethyl methacrylate, polyethyl acrylate, polyacryl amide, polyvinyltoluene, coumarone-indene resin, polyurethane, silicone modified urethane resins, fluorine-containing urethane resins and silicone rubbers. Among these materials, silicone rubbers are preferable and a mixture of a room-temperature vulcanizing silicone rubber and a silicone resin is more preferable.

The back coat layer may include auxiliary agents, such as releasing agents, lubricants and fillers, if necessary.

Specific examples of the auxiliary agents include polyethylene wax, paraffin wax, carnauba wax, higher fatty acid amides, higher aliphatic alcohols, organopolysiloxane, surfactants, carboxylic acids and the derivatives thereof, fluorine-containing resins, silicone oils, silicone resins, talc, silica, calcium carbonate and titanium oxide.

The back coat layer is preferably formed using an aqueous coating liquid and preferred coating weight thereof is from about 0.1 g/$m^2$ to about 10 g/$m^2$ on a dry basis.

Suitable materials useful for the substrate of the image transfer sheet of the present invention include but are not limited to, paper; synthetic paper; cloth; nonwoven fabric; leather; resin films, such as polyethyleneterephthalate, cellulose diacetate, cellulose triacetate, acrylic polymers, cellophane, celluloid, polyvinyl chloride, polycarbonate, polyimide, polyether sulfone, polyetheretherketone, polyethylene and polypropylene; metal plates; metallic foil; or the like. In addition, sheets may also be employed which are made by combining the above-mentioned materials and by coating or laminating water-proof materials or electroconductive materials on the above-mentioned materials. Among these materials, paper having a basis weight of from about 20 to about 200 $g/m^2$ is preferable because of providing good feeding properties for the transfer sheet in image forming apparatus and having a relatively low manufacturing cost.

Suitable coating methods for forming the releasing layer, the image transfer layer and the back coat layer of the present invention include known coating methods, such as roll coating, blade coating, wire bar coating, air knife coating, rod coating, hot melt coating and laminate coating. The image transfer sheet of the present invention is formed, for example, as follows:

(1)a releasing layer coating liquid is prepared by dissolving, dispersing or emulsifying the compounds used for the releasing layer in a solvent such as water or the like;

(2) the prepared releasing layer coating liquid is coated on a substrate by one of the above-mentioned coating methods and dried to form a releasing layer on the substrate;

(3) an image transfer layer coating liquid is also prepared, for example, by the same method as mentioned in (1);

(4) the prepared image transfer layer coating liquid is coated on the releasing layer by one of the above-mentioned coating methods and dried to make an image transfer layer; and (5) a back coat layer coating liquid is also prepared and coated on the non-layered side of the substrate by the same methods as mentioned in (1) and (2) to form a back coat layer on the substrate, if desired.

Suitable image forming methods for use in the present invention by which an image is formed on the image transfer sheet include known image forming methods, such as electrophotography, offset printing, relief printing, plate printing, stencil printing, screen printing, electrostatic recording, ink jet printing, thermal transfer recording, sublimation thermal transfer recording, dot matrix printing and handwriting.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

The following compounds were mixed to prepare a releasing layer coating liquid (A). The prepared releasing layer coating liquid (A) was coated on one side of a substrate of paper having a basis weight of 104.7 $g/m^2$ with a wire bar and then dried to form a releasing layer having a coating weight of 1.7 $g/m^2$ on a dry basis.

(Formulation of Releasing Layer Coating Liquid (A))

room-temperature vulcanizing silicone rubber emulsion 10

(SE-1980 Clear, solid content of 45%, manufactured by Dow Corning Toray Silicone Co., Ltd.)

water 40

The following compounds were mixed to prepare an image transfer layer coating liquid (A). The prepared image transfer coating liquid (A) was coated on the releasing layer with a wire bar and then dried to form an image transfer layer having a coating weight of 30 $g/m^2$ on a dry basis. Thus an image transfer sheet was obtained.

(Formulation of Image Transfer Layer Coating Liquid (A))

methylol-group-containing self-crosslinkable ethylene-vinyl acetate-acrylate copolymer emulsion 10

(Polysol EF-421, Tg of −21° C., solid content of 45%, molecular weight of from 100,000 to 200,000, crosslinking temperature of more than or equal to 120° C., manufactured by SHOWA HIGHPOLYMER CO., LTD.)

methylol-group-containing self-crosslinkable ethylene-vinyl acetate-acrylate copolymer emulsion 10

(Polysol EF-250N, Tg of 20° C., solid content of 50%, molecular weight of from 100,000 to 200,000, crosslinking temperature of more than or equal to 120° C., manufactured by SHOWA HIGHPOLYMER CO., LTD.)

A full color image was formed on the image transfer layer of the obtained image transfer sheet (referred to as image transfer sheet (a)) using a full color image forming apparatus (PRETER 550, manufactured by Ricoh Co., Ltd.). The image qualities of the full color image formed on the image transfer layer were as good as those of the image formed on the special transfer paper for the image forming apparatus.

Then white cotton cloth was superimposed on the full color image on the image transfer sheet (a) and the two sheets were heated with pressure using a thermal transfer pressing machine (Rotary Press, manufactured by Mainichi Mark Co., Ltd.) at 160° C. for 15 seconds. After the heating with pressure, a united sheet of the cotton cloth and the image transfer sheet (a) was taken out from the thermal transfer pressing machine and cooled to room temperature, and then the transfer sheet (a) was separated from the cotton cloth to form the image on the cotton cloth. The image transfer layer was completely transferred onto the cotton cloth together with the image and there was no residual image on the image transfer sheet (a). The transferred image on the cotton cloth had good image qualities.

The transferred image on the cotton cloth was ironed at a temperature suitable for pressing cotton cloth. The transferred image was hardly damaged and also hardly adhered to the iron. The cotton cloth with transferred image was also washed for 15 minutes, rinsed and dewatered using a full automatic washer (KW-60R3, manufactured by Hitachi Ltd.) and dried at room temperature. The procedure of the washing above-mentioned was repeated 10 times, however, discoloration or peeling of the image was not observed.

Example 2

The procedures for preparation and evaluation of the image transfer sheet in Example 1 were repeated except that the formulation of the image transfer layer coating liquid was replaced by the following image transfer layer coating liquid (B) to obtain an image transfer sheet (b).

(Formulation of Image Transfer Layer Coating Liquid (B))

methylol-group-containing self-crosslinkable ethylene-vinyl acetate-acrylate copolymer emulsion 10

(Polysol EF-250N, Tg of 20° C., solid content of 50%, molecular weight of from 100,000 to 200,000, crosslinking temperature of more than or equal to 120° C., manufactured by SHOWA HIGHPOLYMER CO., LTD.)

non reactive carbonate type polyurethane resin emulsion 20

(Super Flex 460, solid content of 38%, Tg of −21° C., manufactured by Dai-ichi Kogyo Seiyaku Co., Ltd.)

The full color image formed on the image transfer layer of the image transfer sheet (b) by the full color image forming apparatus had good image qualities and the transferred full color image on the white cotton cloth had good image qualities and good resistance to the heat of an iron and washing.

Example 3

The procedures for preparation and evaluation of the image transfer sheet in Example 1 were repeated except that the formulation of the image transfer layer coating liquid was replaced by the following image transfer layer coating liquid (C) to obtain an image transfer sheet (c) and the pressing time of the thermal transfer pressing machine was 1 minute.

(Formulation of Image Transfer Layer Coating Liquid (C))

methylol-group-containing self-crosslinkable ethylene-vinyl acetate-acrylate copolymer emulsion 10

(Polysol EF-421, Tg of −21° C., solid content of 45%, molecular weight of from 100,000 to 200,000, cross-linking temperature of more than or equal to 120° C., manufactured by SHOWA HIGHPOLYMER CO., LTD.)

acrylic acid ester copolymer emulsion 10

(Polysol SUM-1400, Tg of 10° C., solid content of 50%, molecular weight of 10,000,000, manufactured by SHOWA HIGHPOLYMER CO., LTD.)

The full color image formed on the image transfer layer of the image transfer sheet (c) by the full color image forming apparatus had good image qualities and the transferred full color image on the white cotton cloth had good image qualities and good resistance to the heat of an iron and washing.

Example 4

The procedures for preparation and evaluation of the image transfer sheet in Example 1 were repeated except that the formulation of the image transfer layer coating liquid was replaced by the following image transfer layer coating liquid (D) to obtain an image transfer sheet (d).

(Formulation of Image Transfer Layer Coating Liquid (D))

methylol-group-containing self-crosslinkable acrylic acid ester copolymer emulsion 10

(Polysol SUM-4002, Tg of −20° C., solid content of 46%, molecular weight of 50,000,000, cross-linking temperature of more than or equal to 120° C., manufactured by SHOWA HIGHPOLYMER CO., LTD.)

methylol-group-containing self-crosslinkable ethylene-vinyl acetate-acrylate copolymer emulsion 10

(Polysol EF-250N, Tg of 20° C., solid content of 50%, molecular weight of from 100,000 to 200,000, cross-linking temperature of more than or equal to 120° C., manufactured by SHOWA HIGHPOLYMER CO., LTD.)

The full color image formed on the image transfer layer of the image transfer sheet (d) by the full color image forming apparatus had good image qualities and the transferred full color image on the white cotton cloth had good image qualities and good resistance to the heat of an iron and washing.

Example 5

The procedures for preparation and evaluation of the image transfer sheet in Example 1 were repeated except that the formulation of the releasing layer coating liquid was replaced by the following releasing layer coating liquid (B) to obtain an image transfer sheet (e).

(Formulation of Releasing Layer Coating Liquid (B))

stearic acid amide emulsion 10 (Himicron G-270, solid content of 21.5%, manufactured by Chukyo Yushi Co., Ltd.)

The image transfer sheet (e) could not be released from the white cotton cloth after the two sheets of the image transfer sheet and the cotton cloth were heated by the thermal transfer pressing machine and cooled to room temperature to transfer an image. However, the image transfer sheet (e) could easily be released from the cotton cloth while the two sheets of the image transfer sheet (e) and the cotton cloth were hot, and the image transfer layer was completely transferred onto the cotton cloth together with the image. The transferred image on the cotton cloth had good image qualities and good resistance to the heat of an iron and washing.

Comparative Example 1

The procedures for preparation and evaluation of the image transfer sheet in Example 1 were repeated except that the formulation of the image transfer layer coating liquid was replaced by the following image transfer layer coating liquid (E) to obtain an image transfer sheet (f).

(Formulation of Image Transfer Layer Coating Liquid (E))

ethylene-vinyl acetate copolymer emulsion 10 (Polysol EVA AD-6, Tg of 3° C., solid content of 56%, manufactured by SHOWA HIGHPOLYMER CO., LTD.)

The full color image formed on the image transfer layer of the image transfer sheet (f) by the full color image forming apparatus had good image qualities and the transferred full color image on the white cotton cloth had good image qualities. However, the image was destroyed and a great quantity of the image transfer layer including the full color toner image was adhered to the iron when the image transferred cotton cloth was ironed. A part of the transferred image on the cotton cloth was peeled after one time of washing.

Comparative Example 2

The procedures for preparation and evaluation of the image transfer sheet in Comparative Example 1 were repeated except that the formulation of the releasing layer coating liquid was replaced by the aforementioned releasing layer coating liquid (B) to obtain an image transfer sheet (g).

The image transfer sheet (g) could not be released from the white cotton cloth after the two sheets were cooled to room temperature, and when the image transfer sheet (g) was forced to release from the cotton cloth, the image transfer sheet (g) was broken. The image transfer sheet (g) could be released from the cotton cloth while the two sheets were hot, however the transferred image had poor image qualities because a part of the image on the image transfer sheet (g) remained thereon after the image transfer sheet (g) was released from the cotton cloth.

As can be understood from the description of Examples 1 to 5 and Comparative Examples 1 and 2, the image transfer sheets of the present invention have the following advantages:

(1) the image transfer sheets can be manufactured using aqueous emulsions, resulting in preventing environmental pollution and saving manufacturing cost;

(2) the image transfer sheets have good feeding properties in the image forming apparatus and the formed images on the image transfer layers have good image qualities;

(3) the images formed on the image transfer sheet are easily and completely transferred onto the image receiving material even when the image transfer sheets are cooled to room temperature if the releasing layers include a silicone compound; and (4) the transferred image on the image receiving material has good image qualities and good resistance to heat of iron and washing.

Additional modifications and variations of the present invention are possible in light of the above teachings. It is therefore to be understood that within the scope of the appended claims the invention may be practiced other than as specifically described herein.

This application is based on Japanese Patent Application No. 08-135434, filed on May 29, 1996, the entire contents of which are herein incorporated by reference.

What is claimed is:

1. An image transfer sheet in which a releasing layer is formed on at least one side of a substrate and an image transfer layer comprising a self-crosslinkable polymer is formed on the releasing layer and which is useful for an image forming method in which an image formed on the image transfer layer is transferred onto an image receiving material together with the image transfer layer.

2. The image transfer sheet of claim 1, wherein the releasing layer comprises a silicone compound.

3. The image transfer sheet of claim 2, wherein the silicone compound comprises a room temperature vulcanizing silicone rubber.

4. The image transfer sheet of claim 1, wherein the self-crosslinkable polymer comprises at least one of a methylol group and an alkoxymethyl group.

5. The image transfer sheet of claim 4, wherein the self-crosslinkable polymer comprises an ethylene-vinyl acetate-acrylate copolymer having at least one of a methylol group and an alkoxymethyl group.

6. The image transfer sheet of claim 1, wherein the self-crosslinkable polymer comprises a self-crosslinkable polymer having a glass transition temperature higher than or equal to 0° C. and a self-crosslinkable polymer having a glass transition temperature lower than 0° C.

7. The image transfer sheet of claim 1, wherein said substrate has two opposed sides, said releasing layer is formed on only one of said sides, and a back coat layer is formed on the other of said sides.

8. The image transfer sheet of claim 7, wherein the back coat layer comprises a room-temperature vulcanizing silicone rubber.

9. The image transfer sheet of claim 1, wherein the self-crosslinkable polymer comprises a self-crosslinkable polymer having a molecular weight of from about 10,000 to about 500,000 and a self-crosslinkable polymer having a molecular weight of from about 10,000,000 to about 60,000,000.

10. An image forming method comprising the steps of:

providing an image transfer sheet in which a releasing layer is formed on at least one side of a substrate and an image transfer layer including a self-crosslinkable polymer is formed on the releasing layer; and forming an image on the image transfer layer.

11. The image forming method of claim 10, wherein the image is formed of toner using electrophotography and fixed by at least one of heat and pressure.

12. The image forming method of claim 10, wherein the image is formed of at least one of a thermofusible ink and a sublimation dye using thermal transfer recording.

13. The image forming method of claim 10, wherein the image forming method further comprises an image transferring step in which the image on the image transfer layer is transferred onto an image receiving material.

14. The image forming method of claim 13, wherein the image on the image transfer layer is transferred onto the image receiving material upon application of heat and pressure.

15. The image forming method of claim 10, wherein the releasing layer comprises a silicone compound.

16. The image forming method of claim 15, wherein the silicone compound comprises a room temperature vulcanizing silicone rubber.

17. The image forming method of claim 10, wherein the self-crosslinkable polymer comprises at least one of a methylol group and an alkoxymethyl group.

18. The image forming method of claim 17, wherein the self-crosslinkable polymer comprises an ethylene-vinyl acetate-acrylate copolymer having at least one of a methylol group and an alkoxymethyl group.

19. The image forming method of claim 17, wherein the self-crosslinkable polymer comprises a self-crosslinkable polymer having a glass transition temperature higher than or equal to 0° C. and a self-crosslinkable polymer having a glass transition temperature lower than 0° C.

20. The image transfer method of claim 10, wherein said substrate has two opposed sides, said releasing layer is formed on only one of said sides, and a back coat layer is formed on the other of said sides.

21. The image transfer method of claim 20, wherein the back coat layer comprises a room-temperature vulcanizing silicone rubber.

22. The image forming method of claim 17, wherein the self-crosslinkable polymer comprises a self-crosslinkable polymer having a molecular weight of from about 10,000 to about 500,000 and a self-crosslinkable polymer having a molecular weight of from about 10,000,000 to about 60,000,000.

* * * * *